(12) United States Patent
Meyer et al.

(10) Patent No.: US 9,898,034 B2
(45) Date of Patent: Feb. 20, 2018

(54) DATA PROCESSING DEVICE AND METHOD FOR DETERMINING A CLOCK RELATIONSHIP

(71) Applicant: Intel IP Corporation, Santa Clara, CA (US)

(72) Inventors: Stefan Meyer, Hoechstadt (DE); Stefan Mueller-Weinfurtner, Nuremberg (DE)

(73) Assignee: Intel IP Corporation, Santa Clara, CA (US)

( * ) Notice: Subject to any disclaimer, the term of this patent is extended or adjusted under 35 U.S.C. 154(b) by 285 days.

(21) Appl. No.: 14/474,332

(22) Filed: Sep. 2, 2014

(65) Prior Publication Data

US 2015/0074444 A1 Mar. 12, 2015

(30) Foreign Application Priority Data

Sep. 9, 2013 (DE) .................. 10 2013 109 818

(51) Int. Cl.
*G06F 1/08* (2006.01)
*G06F 1/12* (2006.01)

(52) U.S. Cl.
CPC . *G06F 1/08* (2013.01); *G06F 1/12* (2013.01)

(58) Field of Classification Search
None
See application file for complete search history.

(56) References Cited

U.S. PATENT DOCUMENTS

| 5,727,193 A * | 3/1998 | Takeuchi | G06F 1/3296 713/300 |
| 6,311,295 B1 * | 10/2001 | Casal | G01R 31/30 714/55 |
| 8,589,717 B1 * | 11/2013 | Davis | G06F 1/04 713/500 |
| 2003/0174587 A1 * | 9/2003 | Bening | G04G 3/022 368/200 |
| 2006/0155491 A1 * | 7/2006 | Bode | G01R 23/10 702/75 |
| 2010/0202379 A1 * | 8/2010 | Luo | H04B 7/2656 370/329 |

FOREIGN PATENT DOCUMENTS

GB 2491001 A 11/2012

OTHER PUBLICATIONS

Office Action received for German Patent Application No. 10 2013 109 818.5, dated Jun. 7, 2014, 4 pages of Office action and 2 pages of English Translation.

* cited by examiner

*Primary Examiner* — Paul J Yen
(74) *Attorney, Agent, or Firm* — Viering, Jentschura & Partner mbB

(57) ABSTRACT

A data processing device is described comprising a first clock generator configured to generate a first clock signal with a first frequency; a second clock generator configured to generate a second clock signal with a second frequency, wherein the second frequency is higher than the first frequency; and a processing circuit configured to sample a clock cycle number of the second clock signal at a plurality of sample times given by the first clock signal and determine a relationship between the first frequency and the second frequency based on a minimization of a measure of a deviation of the sampled clock cycle numbers from the clock cycle numbers of the second clock signal at the plurality of sample times expected according to the determined relationship.

19 Claims, 6 Drawing Sheets

DATA PROCESSING DEVICE AND METHOD FOR DETERMINING A CLOCK RELATIONSHIP

CROSS-REFERENCE TO RELATED APPLICATION

This application claims priority to German Patent Application Serial No. 10 2013 109 818.5, which was filed Sep. 9, 2013, and is incorporated herein by reference in its entirety.

TECHNICAL FIELD

Embodiments described herein generally relate to data processing devices and methods for determining a clock relationship.

BACKGROUND

A mobile device typically provides a plurality of modes of operation. In one mode it typically handles active transmission and reception implying high power consumption, while the so called deep sleep (Dormant State) mode is putting the mobile device in a lower power state only allowing discontinuous reception. The low power consumption of the dormant state is typically implemented by disabling a big portion of the processing components of the mobile device, disabling a high frequency clock (providing a clock signal in the order of MHz) and only allowing a power efficient low frequency clock (providing a clock signal in the order of kHz) to trigger a wake up of the system, i.e. the disabled components, after a certain amount of time. For this, the low frequency clock needs to have a certain accuracy and known timing relation to the high frequency clock to ensure that the wakeup of the system is done at a known accurate position in time. Otherwise, for example, the synchronization to the network might be lost or the device needs enhanced search capabilities for cell reacquisition. Accordingly, accurate and efficient approaches that allow determining the relation between the low frequency clock and the high frequency clock are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
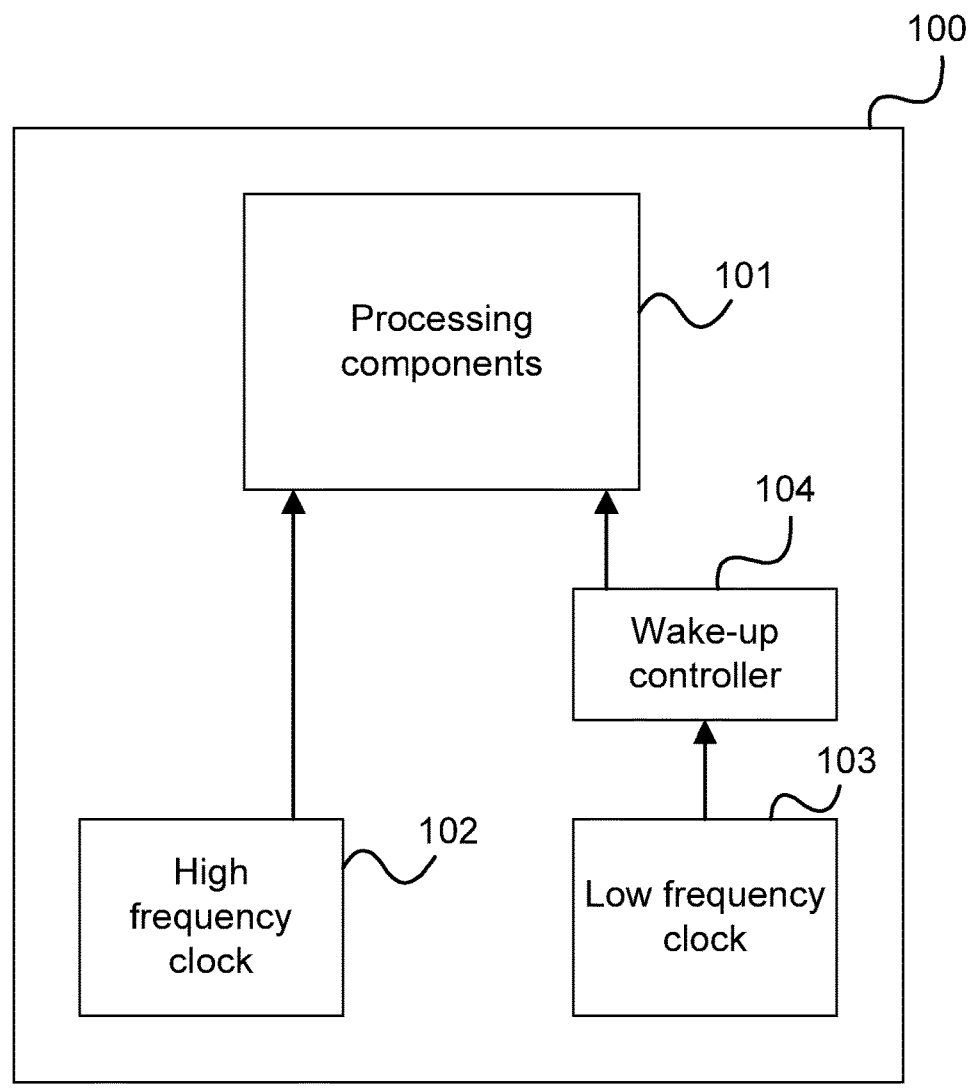
FIG. 1 shows a mobile terminal.

FIG. 1 shows a mobile terminal 100.

The mobile terminal 100 includes processing components 101 which are disabled when the mobile terminal is in a deep sleep state (dormant state). The mobile terminal 100 further includes a high frequency clock (providing a high frequency clock signal with a frequency in the order of MHz) which provide a clock signal to the processing components 101 when they are active (i.e. enabled), i.e. when the mobile terminal is not in deep sleep state. Further, the mobile terminal 100 comprises a low frequency clock 103 (providing a low frequency clock signal with a frequency in the order of kHz). Based on the clock signal provided by the low frequency clock 103, a wake-up controller 104 may wake up the processing component 101, e.g. after a predetermined number of clock cycles of the clock signal provided by the low frequency clock 103 have passed after entering sleep state, i.e. may return the mobile terminal to active state.

To ensure that the wake-up controller 104 wakes up the processing components 101 at accurate positions in time (e.g. in line with paging timings of the mobile cell on which the mobile terminal 100 is camping) the low frequency clock 103 needs a certain accuracy and the timing relation between the low frequency clock signal to the high frequency clock signal needs to be known by the mobile terminal 100, e.g. by the wake-up controller 104.

Frequency ratio estimation between the high frequency clock 102 and the low frequency clock 103, i.e. determination of the frequency relation between the high frequency clock signal and the low frequency clock signal may be done by counting the number of high frequency clock cycles versus a given number of low frequency clock cycles. This process requires a certain amount of time (typically below 100 ms, e.g. in the range of 50 ms) to reach a reasonably good frequency ratio estimation. However, this amount of time can be longer than the necessary active period of the mobile terminal in a typical paging scenario and thus may limit the standby time of the system, i.e. the time during which the mobile terminal 100 is in dormant state. In order to keep the active time of the system short, frequency ratio estimation may for example be only executed when a certain deviation between low frequency clock and high frequency clock is detected (e.g. if a low frequency clock pulse is delivered x high frequency clocks cycles later or before an expected time). Further, upon the detection of such a deviation, the execution of the frequency ratio estimation may be handled specific to the RAT (radio access technology) that the mobile terminal 100 currently uses specifically to utilize the active periods for this currently used RAT as much as possible. Typically, the detection of a deviation that requires a new frequency ratio estimation can be RAT specific.

As described in the following, a data processing device, e.g. a mobile terminal, is provided which avoids complex, RAT specific scheduling of frequency ratio estimation and allows a frequency ratio estimation which requires little time. Furthermore, it may for example allow factory testing of signal integrity and/or calibration of the low frequency clock that requires little time.

Figure 2:
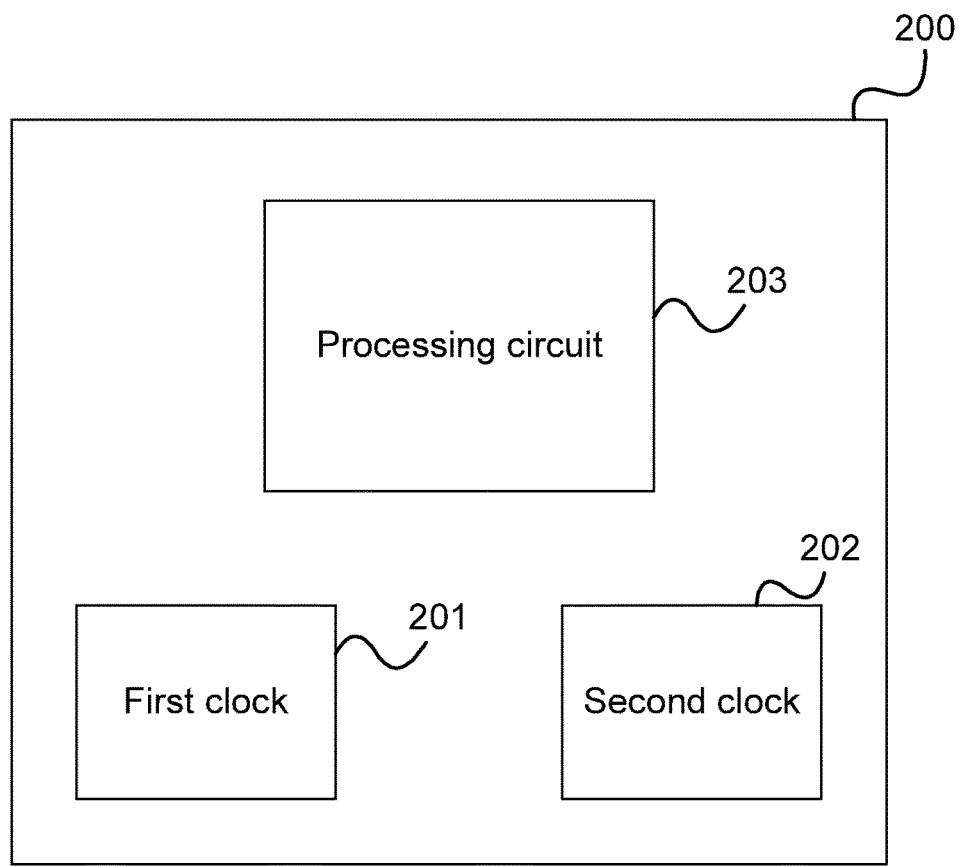
FIG. 2 shows a data processing device.

FIG. 2 shows a data processing device 200.

The data processing device 200 includes a first clock generator 201 configured to generate a first clock signal with a first frequency and a second clock generator 202 configured to generate a second clock signal with a second frequency, wherein the second frequency is higher than the first frequency.

The data processing device 200 further includes a processing circuit 203 configured to sample a clock cycle number of the second clock signal at a plurality of sample times given by the first clock signal and determine a relationship between the first frequency and the second frequency based on a minimization of a measure of a deviation of the sampled clock cycle numbers from the clock cycle numbers of the second clock signal at the plurality of sample times expected according to the determined relationship.

In other words, the frequency relationship (e.g. the frequency difference) between a high frequency clock and a low frequency clock is determined by sampling the high frequency clock at sampling times given by the low frequency clock and determining the frequency relationship such that the expected sample values (which depend from the determined frequency relationship) fit the actual sample values according to some measure.

Figure 3:
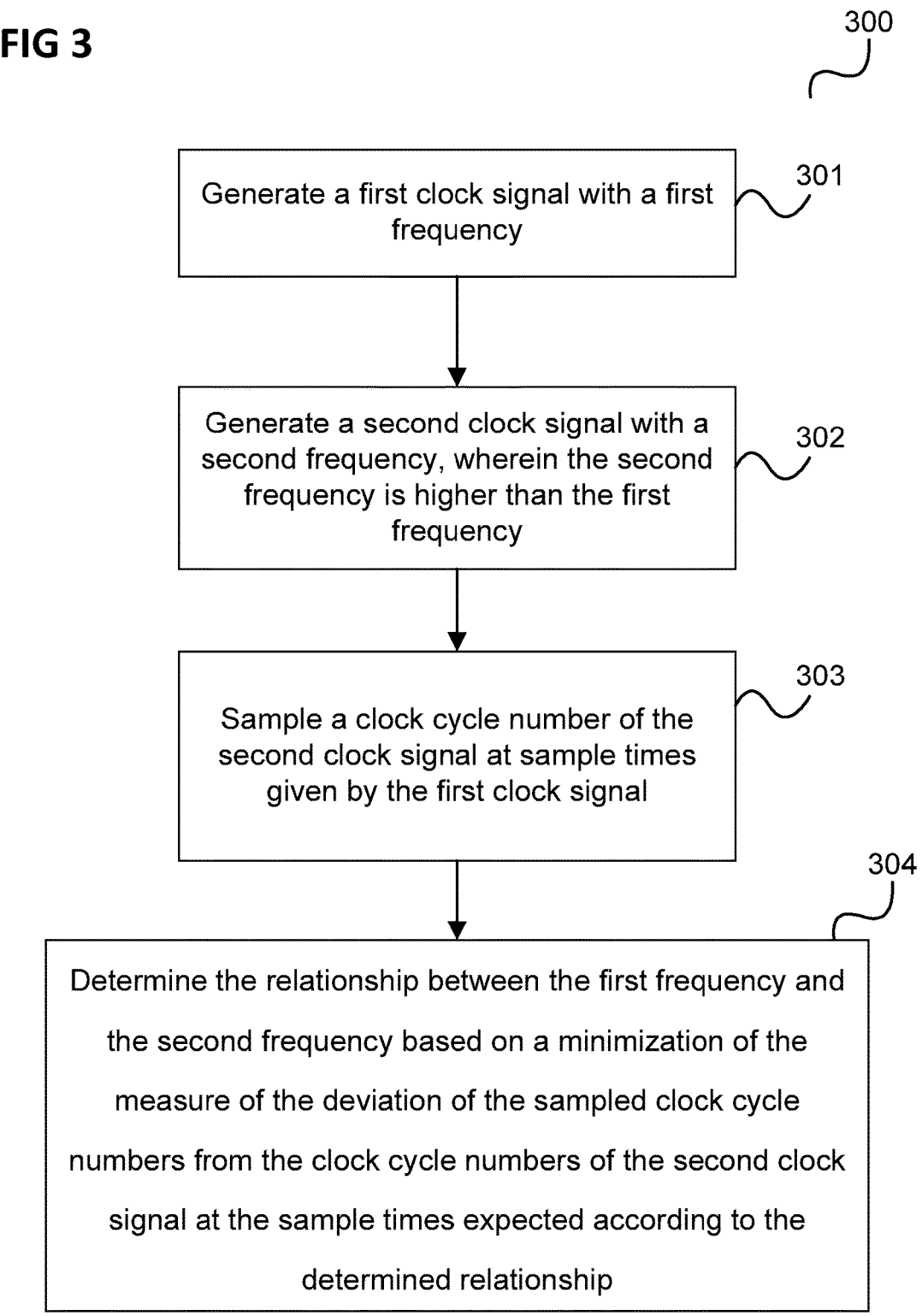
FIG. 3 shows a flow diagram illustrating a method for determining a clock relationship.

The data processing device for example carries out a method as illustrated in FIG. 3.

FIG. 3 shows a flow diagram 300.

The flow diagram 300 illustrates a method for determining a clock relationship, for example carried out by a data processing device.

In 301, the data processing device generates a first clock signal with a first frequency.

In 302, the data processing device generates a second clock signal with a second frequency, wherein the second frequency is higher than the first frequency.

In 303, the data processing device samples a clock cycle number of the second clock signal at a plurality of sample times given by the first clock signal.

In 304, the data processing device determines the relationship between the first frequency and the second frequency based on a minimization of a measure of a deviation of the sampled clock cycle numbers from the clock cycle numbers of the second clock signal at the plurality of sample times expected according to the determined relationship.

The following examples pertain to further embodiments.

Example 1 is a data processing device as described with reference to FIG. 2.

In Example 2, the subject matter of Example 1 can optionally include that the relationship between the first frequency and the second frequency is the ratio between the first frequency and the second frequency.

In Example 3, the subject matter of Examples 1-2 can optionally include that the plurality of sample times expected according to the determined relationship fit the sample values according to a predetermined measure.

In Example 4, the subject matter of Examples 1-3 can optionally include that the plurality of sample times are clock edges of the first clock signal.

In Example 5, the subject matter of Examples 1-4 can optionally include that the plurality of sample times are rising clock edges of the first clock signal.

In Example 6, the subject matter of Examples 1-5 can optionally include that the plurality of sample times are falling clock edges of the first clock signal.

In Example 7, the subject matter of Examples 1-6 can optionally include that the measure of the deviation is a sum of the squares of the errors between the sampled clock cycle numbers and the clock cycle numbers expected according to the determined relationship.

In Example 8, the subject matter of Examples 1-7 can optionally include that the processing circuit is configured to determine the relationship for the rising clock edges of the first clock signal as the sampling times and for the falling clock edges as the sampling times.

In Example 9, the subject matter of Examples 1-8 can optionally include that the processing circuit is configured to determine a phase between the first clock signal and the second clock signal based on a minimization of the measure of the deviation of the sampled clock cycle numbers from the clock cycle numbers of the second clock signal at the plurality of sample times expected according to the determined phase.

In Example 10, the subject matter of Examples 1-9 can optionally include that the processing circuit is configured to jointly determine the relationship and the phase based on a minimization of the measure of the deviation of the sampled clock cycle numbers from the clock cycle numbers of the second clock signal at the plurality of sample times expected according to the determined frequency and the determined phase.

In Example 11, the subject matter of Examples 1-10 can optionally be a communication device.

In Example 12, the subject matter of Examples 1-11 can optionally be a mobile communication terminal.

In Example 13, the subject matter of Example 12 can optionally include that the processing circuit is configured to sample the clock cycle number at the plurality of sample times during a paging frame.

In Example 14, the subject matter of Examples 12-13 can optionally include a communication module for a radio access technology and that the processing circuit is configured to sample the clock cycle number at the plurality of sample times during the activity of the communication module.

In Example 15, the subject matter of Examples 12-14 can optionally include, for each of a plurality of radio access technologies, a communication module and that the processing circuit is configured to signal the determined relationship to each communication module.

Example 16 is a method as described above with reference to FIG. 3.

In Example 17, the subject matter of Example 16 can optionally include the relationship between the first frequency and the second frequency being the ratio between the first frequency and the second frequency.

In Example 18, the subject matter of Examples 16-17 can optionally include that the plurality of sample times expected according to the determined relationship fit the sample values according to a predetermined measure.

In Example 19, the subject matter of Examples 16-18 can optionally include the plurality of sample times being clock edges of the first clock signal.

In Example 20, the subject matter of Examples 16-19 can optionally include the plurality of sample times being rising clock edges of the first clock signal.

In Example 21, the subject matter of Examples 16-19 can optionally include the plurality of sample times being falling clock edges of the first clock signal.

In Example 22, the subject matter of Examples 16-21 can optionally include the measure of the deviation being a sum of the squares of the errors between the sampled clock cycle numbers and the clock cycle numbers expected according to the determined relationship.

In Example 23, the subject matter of Examples 16-22 can optionally include determining the relationship for the rising clock edges of the first clock signal as the sampling times and for the falling clock edges as the sampling times.

In Example 24, the subject matter of Examples 16-23 can optionally include determining a phase between the first clock signal and the second clock signal based on a minimization of the measure of the deviation of the sampled clock cycle numbers from the clock cycle numbers of the second clock signal at the plurality of sample times expected according to the determined phase.

In Example 25, the subject matter of Examples 24 can optionally include jointly determining the relationship and the phase based on a minimization of the measure of the deviation of the sampled clock cycle numbers from the clock cycle numbers of the second clock signal at the plurality of sample times expected according to the determined frequency and the determined phase.

In Example 26, the subject matter of Examples 16-25 can optionally be performed by a communication device.

In Example 27, the subject matter of Examples 16-26 can optionally be performed by a mobile communication terminal.

In Example 28, the subject matter of Example 27 can optionally include sampling the clock cycle number at the plurality of sample times during a paging frame.

In Example 29, the subject matter of Examples 27 can optionally include the mobile communication terminal comprising a communication module for a radio access technology and the method comprising sampling the clock cycle number at the plurality of sample times during the activity of the communication module.

In Example 30, the subject matter of Examples 27 can optionally include the mobile communication terminal comprising, for each of a plurality of radio access technologies, a communication module and the method comprising signaling the determined relationship to each communication module.

Example 31 is a computer readable medium having recorded instructions thereon which, when executed by a processor, make the processor perform a method for performing radio communication according to any one of Examples 15 to 28.

Example 32 is a data processing device comprising a means for generating a first clock signal with a first frequency; a means for generating a second clock signal with a second frequency, wherein the second frequency is higher than the first frequency; a means for sampling a clock cycle number of the second clock signal at a plurality of sample times given by the first clock signal and determining a relationship between the first frequency and the second frequency based on a minimization of a measure of a deviation of the sampled clock cycle numbers from the clock cycle numbers of the second clock signal at the plurality of sample times expected according to the determined relationship.

In Example 33, the subject matter of Example 32 can optionally include the relationship between the first frequency and the second frequency being the ratio between the first frequency and the second frequency.

In Example 34, the subject matter of Examples 32-33 can optionally include that the plurality of sample times expected according to the determined relationship fit the sample values according to a predetermined measure.

In Example 35, the subject matter of Examples 32-34 can optionally include the plurality of sample times being clock edges of the first clock signal.

In Example 36, the subject matter of Examples 32-35 can optionally include the plurality of sample times being rising clock edges of the first clock signal.

In Example 37, the subject matter of Examples 32-35 can optionally include the plurality of sample times being falling clock edges of the first clock signal.

In Example 38, the subject matter of Examples 32-37 can optionally include the measure of the deviation being a sum of the squares of the errors between the sampled clock cycle numbers and the clock cycle numbers expected according to the determined relationship.

In Example 39, the subject matter of Examples 32-38 can optionally include the means for sampling the clock cycle number and determining the relationship being a means for determining the relationship for the rising clock edges of the first clock signal as the sampling times and for the falling clock edges as the sampling times.

In Example 40, the subject matter of Examples 32-39 can optionally include the means for sampling the clock cycle number and determining the relationship being a means for determining a phase between the first clock signal and the second clock signal based on a minimization of the measure of the deviation of the sampled clock cycle numbers from the clock cycle numbers of the second clock signal at the plurality of sample times expected according to the determined phase.

In Example 41, the subject matter of Examples 32-40 can optionally include the means for sampling the clock cycle number and determining the relationship being a means for jointly determining the relationship and the phase based on a minimization of the measure of the deviation of the sampled clock cycle numbers from the clock cycle numbers of the second clock signal at the plurality of sample times expected according to the determined frequency and the determined phase.

In Example 42, the subject matter of Examples 32-41 can optionally be a communication device.

In Example 43, the subject matter of Examples 32-42 can optionally be a mobile communication terminal.

In Example 44, the subject matter of Example 43 can optionally include the means for sampling the clock cycle number and determining the relationship being a means for sampling the clock cycle number at the plurality of sample times during a paging frame.

In Example 45, the subject matter of Examples 43-44 can optionally include a communication module for a radio access technology and the means for sampling the clock cycle number and determining the relationship is a means for sampling the clock cycle number at the plurality of sample times during the activity of the communication module.

In Example 46, the subject matter of Examples 43-45 can optionally include, for each of a plurality of radio access technologies, a communication module and a means for signaling the determined relationship to each communication module.

It should be noted that one or more of the features of any of the examples above may be combined with any one of the other examples.

The components of the data processing device (e.g. the clock generators and the processing circuit) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

In the following, an example for the data processing device 200 is described in more detail.

Figure 4:
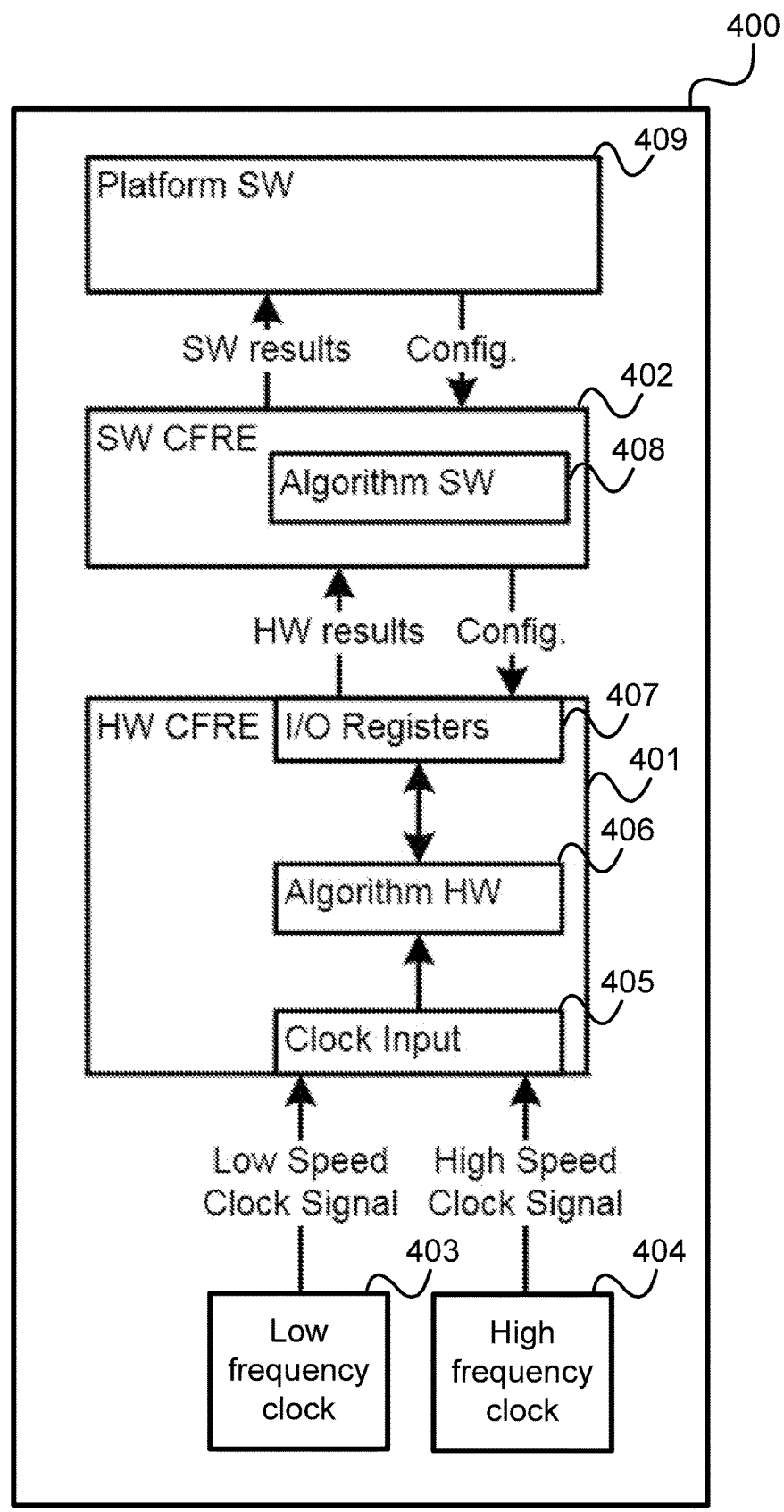
FIG. 4 shows a mobile terminal implementing a clock frequency ratio estimation process.

FIG. 4 shows a mobile terminal 400.

In this example, the clock frequency ratio estimation (CFRE) is performed by a hardware component 401 and a software component 402. The mobile terminal 400 includes, similarly to the mobile terminal 100, a low frequency clock 403 and a high frequency clock 404. The low frequency clock 403 provides a low frequency clock signal to a clock input 405 of the CFRE hardware component 401 and the high frequency clock 404 provides a high frequency clock signal to the clock input 405 of the CFRE hardware component 402.

The CFRE hardware component 401 includes a processing circuit which implements the hardware part of the CFRE algorithm 406, i.e. the part of the CFRE algorithm performed by the hardware component 401, and a set of I/O registers 407 which may be used as configuration registers and output registers.

The CFRE hardware component 401 has the low frequency clock signal and the high frequency clock signal as input and handles the derivation of HW results including sufficient statistics which it provides to the CFRE software component via the I/O registers 407 after a certain time, denoted as frequency ratio estimation period. The hardware part of the CFRE algorithm as described below requires only a small gate count and power consumption.

The CFRE software component 402 performs the software part of the CFRE algorithm 408 (e.g. implemented by software running on a processor of the data processing device) and handles the clock frequency ratio estimation after the frequency ratio estimation period and calculates software results including the frequency ratio from the results delivered by the CFRE hardware component 401.

According to the CFRE algorithm as described below, the calculations performed by the CFRE software component 402 require a low amount of processing power.

The CFRE software component 402 delivers the software results to a platform software 409 (e.g. a control software) of the mobile terminal 400. The software (SW) results may also include quality information about the slow clock signal, as duty cycle or jitter in the measured in the clock edges. When the CFRE software component 402 has finished CFRE the calculated SW result values can be fetched by or pushed to other components.

Figure 5:
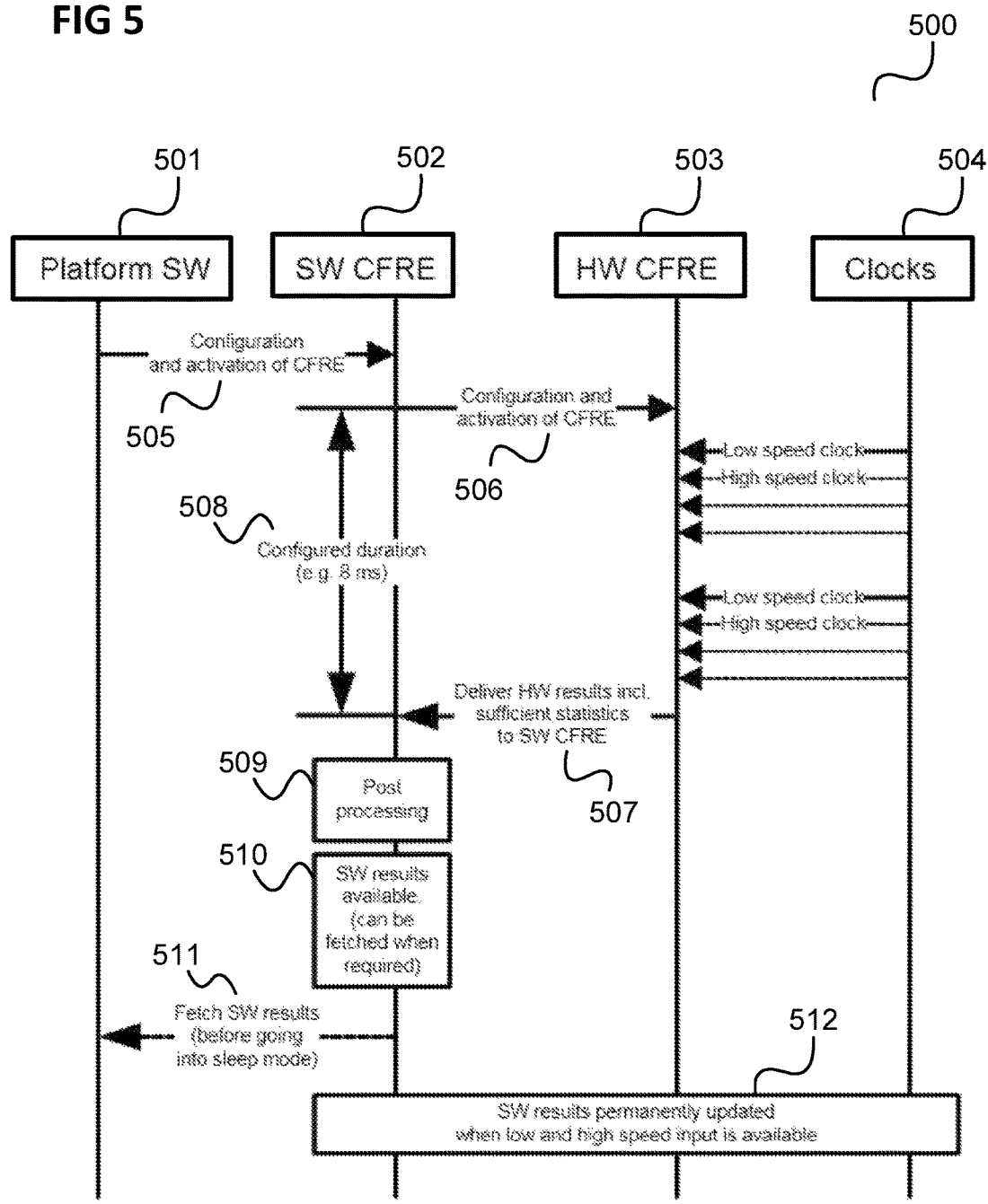
FIG. 5 shows a message flow diagram illustrating a clock frequency ratio estimation process.

The interaction between the components of the mobile terminal 400 described with reference to FIG. 4 is illustrated in FIG. 5.

FIG. 5 shows a message flow diagram 500.

The message flow takes place between a platform software 501 corresponding to platform software 409, a CFRE software component 502 corresponding to CFRE software component 402, a CFRE hardware component 503 corresponding to CFRE hardware component 401 and clocks 504 corresponding to clocks 403, 404.

In 505 the platform software 501 (e.g. per instruction by the user) configures the CFRE software component 502. In 506, The CFRE software component 502 forwards the configuration to the associated CFRE hardware component (or hardware block) 503. Following the configuration and activation of the CFRE process, the CFRE hardware component 503 constantly derives HW results in 507 and periodically notifies the CFRE software component 502 after each frequency ratio estimation period 508 about a new set of HW results. Following this notification the CFRE software components calculates the SW results in 509 and stores the SW results including an estimate for the clock frequency ratio in 510. The SW results can be fetched by or pushed in 511 via the software platform to a component using this information.

The process of 507 to 511 may be repeated in 512 such that the SW results are continuously updated.

The low power consumption of the CFRE hardware component and the CFRE software component allows a constant derivation (and update) of the CFR estimate. RAT specific scheduling or checking of conditions when to or not to activate the CFRE are not required. However, this may be added (e.g. on top of the process as illustrated in FIG. 5) in order to further decrease the power consumption. This may be invisible to the user by hiding it within the CFRE software component 408. The CFRE process as illustrated in FIG. 5 can also be used for factory testing. For example, in case the determined frequency ratio is within a specified limit a tested device may be accepted while otherwise the low frequency clock (e.g. a 32 kHz clock) is assumed to be broken. As described below, the CFRE algorithm also allows factory testing of the signal integrity by verifying the duty cycle and the jitter in the clock edges.

Figure 6:
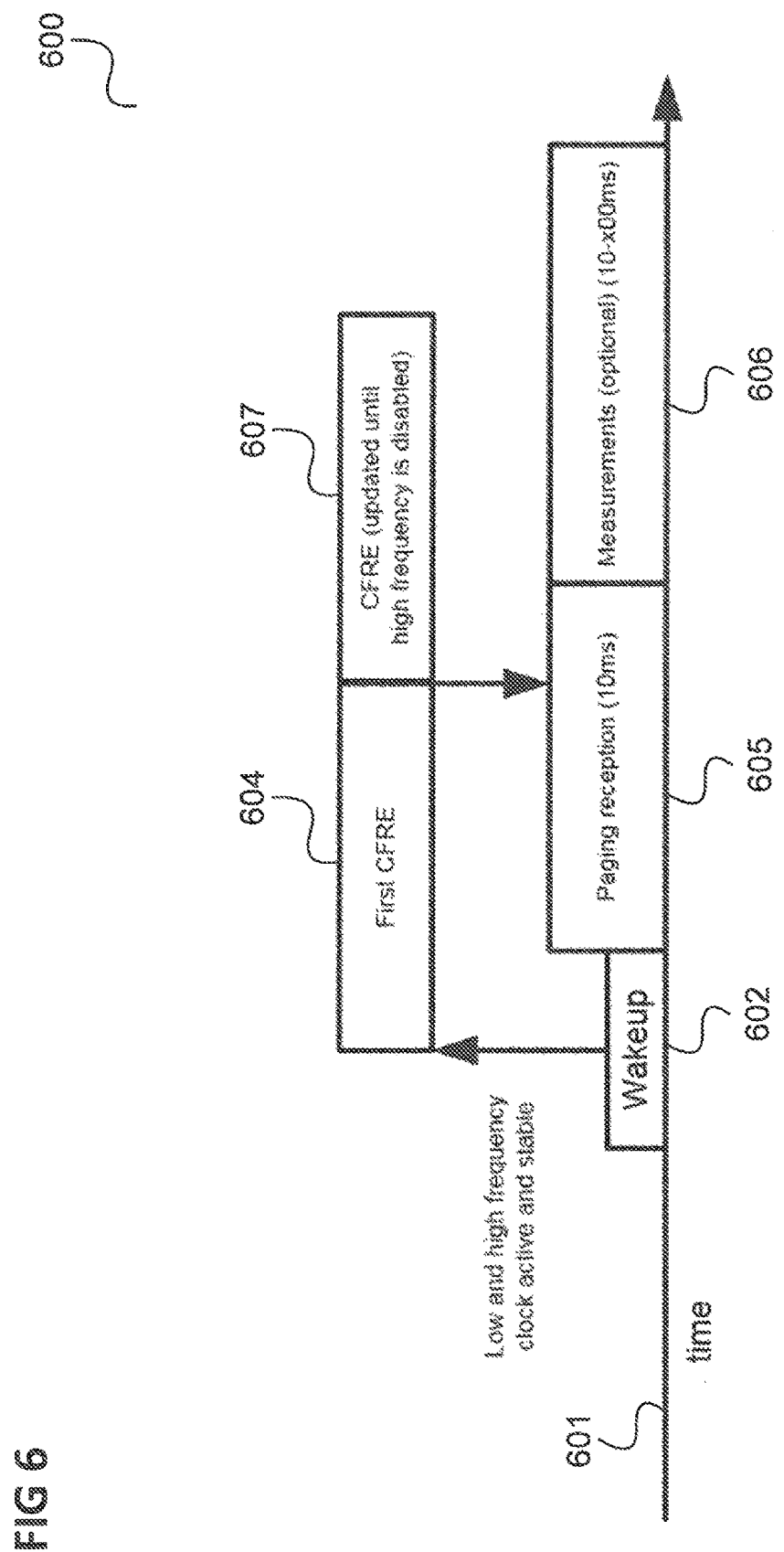
FIG. 6 shows a timing diagram illustrating clock frequency ratio estimation in context of a paging activity.

An example for CFRE in context of a typical paging activity is illustrated in FIG. 6.

FIG. 6 shows a timing diagram 600.

Time increases from left to right along a time axis 601.

It is assumed that the mobile terminal 400 wakes up during a wake-up phase (which has a certain duration) 602. When the low frequency clock and the high frequency clock are both active and stable, they provide their clock signals to the CFRE hardware component in 503 for a first CFRE 604. Further, after wake-up, the mobile terminal 400 performs paging reception 605, i.e. reception of a paging frame. If, after the first CFRE 604, the high frequency clock is still active, e.g. since paging reception 605 has not yet finished or the mobile terminal 400 stays active to perform measurements 606, further CFRE 607 may be performed to update the result of the first CFRE 604, e.g. to increase the accuracy of the estimation frequency ratio as estimated in the first CFRE 604.

As can be seen, the first CFRE 604 may be carried out within the duration of the paging reception 605 such that the activity of the mobile terminal 400 does not have to be lengthened due to the CFRE. Furthermore, the small power consumption of the CFRE allows running the CFRE during every paging cycle.

In the following, an example for a CFRE algorithm is given.

The CFRE hardware component 401 maintains a counter incrementing by one at each rising clock edge, for example, of the high frequency clock signal. It samples this counter value at the rising clock edges, for example, of the slow clock signal. The sample of the counter at the ith (i=0, . . . , K) rising clock edge of the slow clock signal is denoted as $k_f[i]$. The observed counter values contain the slow-clock edge jitter and fast-clock counter quantization as noise. The CFRE hardware component 401 collects the counter samples taken at clock edges of the slow frequency clock during the K cycles in the observation window (e.g.

corresponding to the frequency ratio estimation period) in a $(K+1)\times 1$ vector $k=[k_f[0], \ldots, k_f[K]]^T$.

The tuple (or pair) including the starting phase (i.e. the phase between the low frequency clock and the high frequency clock at the time of the first sample) and the frequency ratio is denoted as $$e = \begin{bmatrix} k_{f,0} \\ c \end{bmatrix}.$$

The sum squared error for the regression line parameterized by that tuple is given by $$J(k, \tilde{e}) = \left\| \begin{bmatrix} 1 & 0 \\ \vdots & \vdots \\ 1 & K \end{bmatrix} \right\|^2 = e^T_{||}k - A\tilde{e}^2_{||} = k^Tk - 2\tilde{e}^TA^Tk + \tilde{e}^TA^TA\tilde{e} \text{ with}$$

$$A = \begin{bmatrix} 1 & 0 \\ \vdots & \vdots \\ 1 & K \end{bmatrix}.$$

The joint least-squares (LS) estimate for the tuple e can be obtained by $$\hat{e} = \underset{\tilde{e}}{\mathrm{argmin}} J(k, \tilde{e})$$

and can be written as $$\hat{e}=(A^TA)^{-1}A^Tk=(A^TA)^{-1}*s \text{ where } s=A^Tk. \text{ is a } 2\times 1 \text{ vector.}$$

Herein, the inverse can be computed as $$(A^TA)^{-1} = \frac{2}{K(K+1)(K+2)} \begin{bmatrix} K(2K+1) & -3K \\ -3K & 6 \end{bmatrix}.$$

The expected value of the LS value $J(k, \hat{e})=k^Tk-s^T(A^TA)^{-1}s$ reads $$E\{J(k,\hat{e})\}=(K-1)\sigma_k^2$$

where $\sigma_k^2$ is the slow frequency clock edge variance in units of fast clock cycles numbers.

This expected value can thus be used to estimate jitter in the slow frequency clock edges.

The CFRE hardware component 401 accumulates the 2×1 vector s during the observation window (including the K+1 samples of k). The vector s forms the HW results or sufficient statistics delivered to the CFRE software component 402. This can be seen to correspond basically to two matched filters creating a tuple representing a loss-less sufficient statistic for the LS estimation based on the clock-model assumption.

The CFRE hardware component 401 may further provide the value of $k^Tk$ to the CFRE software component 402.

It should be noted that the CFRE hardware component 401 may provide these values for both the rising clock edges of the slow frequency clock as sampling times and the falling clock edges of the slow frequency clock as sampling times.

The CFRE software component 402 receives the HW results and the algorithm SW 408 computes the LS estimate for the CFR according to $$\hat{c} = \frac{6}{K(K+1)(K+2)}[-K \quad 2]\cdot s$$

and may further compute the LS estimate for the starting phase according to $$\hat{k}_{f,0} = \frac{2}{(K+1)(K+2)}[2K+1 \quad -3]\cdot s.$$

In case that the CFRE hardware component 401 provides HW results for both rising edge samples and falling edge samples the CFRE software component 402 may determine the LS estimate for the CFR and the LS estimate for the starting phase for both rising edge samples and falling edge samples. For example, from the two starting phases (one for rising edge samples and one for falling edge samples) the CFRE software component may derive an estimate for the duty cycle of the low frequency clock.

The CFRE software component 402 may further compute $(k^Tk-s^T(A^TA)^{-1}s)/K-1)$ as estimate for the variance of the jitter in the low frequency clock signal edges.

The algorithm as described above is free of estimation bias. Simulations show that with the algorithm as described above, for an estimation interval of 8 ms, for sampling at only one edge type, enables a variance reduction by almost 17 dB, i.e. almost factor 50. When the jitter in the rising edges and falling edges is equal, the combination of the two results for both edge types enables another gain of 3.01 dB.

In summary, the algorithm as above allows

Short observation windows for clock frequency ratio estimation.

Short platform activity and less power consumption due to shorter observation periods.

High accuracy even when using much short observation times.

Due to a very short observation window RAT-independent CFRE and omission of checks when the estimation should be done.

Factory tests/measurements for the low speed clock in a short time.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:
1. A data processing device comprising:
a first clock generator configured to generate a first clock signal with a first frequency;
a second clock generator configured to generate a second clock signal with a second frequency;
a processing circuit configured to:
sample a clock cycle number of the second clock signal at a plurality of sample times given by a predetermined number of the first clock signal during a paging reception, wherein the plurality sample times are each shorter than a full clock cycle of the second clock signal for obtaining a representative sample; and determine a relationship between the first frequency and the second frequency with the obtained samples,
wherein the relationship is determined as a ratio of the determined number of the second clock signal to the predetermined number of the first clock signal, and
wherein the relationship is further determined by minimizing a deviation of the sampled clock cycle numbers from a predetermined clock cycle numbers of the second clock signal; and a wake-up controller configured to wake up the data processing device based on the determined relationship.

2. The data processing device of claim 1, wherein the plurality of sample times expected according to the determined relationship fit the sample values according to a predetermined measure.

3. The data processing device of claim 1, wherein the plurality of sample times are clock edges of the first clock signal.

4. The data processing device of claim 1, wherein the plurality of sample times are rising clock edges of the first clock signal.

5. The data processing device of claim 1, wherein the plurality of sample times are falling clock edges of the first clock signal.

6. The data processing device of claim 1, wherein the measure of the deviation is a sum of the squares of the errors between the sampled clock cycle numbers and the clock cycle numbers expected according to the determined relationship.

7. The data processing device of claim 1, wherein the processing circuit is configured to determine the relationship for the rising clock edges of the first clock signal as the sampling times and for the falling clock edges as the sampling times.

8. The data processing device of claim 1, wherein the processing circuit is configured to determine a phase between the first clock signal and the second clock signal by minimizing the deviation of the sampled clock cycle numbers from the predetermined clock cycle numbers of the second clock signal.

9. The data processing device of claim 8, wherein the processing circuit is configured to jointly determine the relationship and the phase by minimizing the deviation of the sampled clock cycle numbers from the predetermined clock cycle numbers of the second clock signal.

10. The data processing device of claim 1, being a communication device.

11. The data processing device of claim 1, being a mobile communication terminal.

12. The data processing device of claim 11, wherein the processing circuit is configured to sample the clock cycle number at the plurality of sample times during a paging frame.

13. The data processing device of claim 11, comprising a communication module for a radio access technology and the processing circuit is configured to sample the clock cycle number at the plurality of sample times during the activity of the communication module.

14. The data processing device of claim 11, comprising, for each of a plurality of radio access technologies, a communication module and the processing circuit is configured to signal the determined relationship to each communication module.

15. The data processing device of claim 1, wherein the second frequency is higher than the first frequency.

16. A method for determining a clock relationship comprising:
generating a first clock signal with a first frequency;
generating a second clock signal with a second frequency;
sampling a clock cycle number of the second clock signal at a plurality of sample times given by a predetermined number of the first clock signal during a paging reception;
wherein the plurality sample times are each shorter than a full clock cycle of the second clock signal for obtaining a representative sample;
determining a relationship between the first frequency and the second frequency with the obtained samples,
wherein the relationship is determined as a ratio of the determined number of the second clock signal to the predetermined number of the first clock signal, and
wherein the relationship is further determined by minimizing a deviation of the sampled clock cycle numbers from a predetermined clock cycle numbers of the second clock signal; and
waking up a data processing device based on the determined relationship by a wake-up controller.

17. The method of claim 16, wherein the plurality of sample times expected according to the determined relationship fit the sample values according to a predetermined measure.

18. The method of claim 16, wherein the plurality of sample times are clock edges of the first clock signal.

19. The method of claim 16, wherein the second frequency is higher than the first frequency.

* * * * *